United States Patent [19]

Fitzgerald

[11] 4,279,148

[45] Jul. 21, 1981

[54] ANTI-CLOGGING FLUME AND STRUCTURE FOR METERING FLUID FLOW

[76] Inventor: Joseph C. Fitzgerald, 439 Minorca Ave., Coral Gables, Fla. 33134

[21] Appl. No.: 146,637

[22] Filed: May 5, 1980

[51] Int. Cl.³ .............................................. G01F 1/20
[52] U.S. Cl. ...................................................... 73/215
[58] Field of Search ................................. 73/215, 216

[56] References Cited

U.S. PATENT DOCUMENTS

| | | | |
|---|---|---|---|
| 1,372,138 | 3/1921 | Herschel | 73/215 |
| 2,100,219 | 11/1937 | Kennison | 73/215 |
| 2,283,906 | 5/1942 | Bennett | 73/215 |
| 3,124,000 | 3/1964 | Melas | 73/215 |
| 3,301,050 | 1/1967 | McNulty | 73/215 |
| 4,127,032 | 11/1978 | Martig, Jr. | 73/215 |

FOREIGN PATENT DOCUMENTS 212115  9/1966  Sweden ..................................... 73/215

OTHER PUBLICATIONS

Reploge, "Portable, Adjustable Flow-Measuring Flume for Small Canals," 9/77, pp. 928-933, vol. 20, #5, ASAE.

Primary Examiner—Herbert Goldstein
Attorney, Agent, or Firm—John Cyril Malloy

[57] ABSTRACT

An anti-clogging flume and structure for metering fluid flow over the flume wherein the flume is of a length sized to be inserted within a pipe and which flume has a generally cylindrical opening as an inlet at one end and a V-shaped outlet at the other end and the flume converges from the inlet end smoothly inwardly and upwardly to the outlet end with a spillway being defined at the outlet end, the spillway outlet being elevated with respect to the lowermost portion of the flume at the inlet end, and structure exterior of the flume for introducing gas into the flume adjacent the inlet end through a hole in the lowermost portion to bubble the gas through the flow along the flume adapting it for use with a recording device to meter, measure and record flow of water through the flume.

7 Claims, 7 Drawing Figures

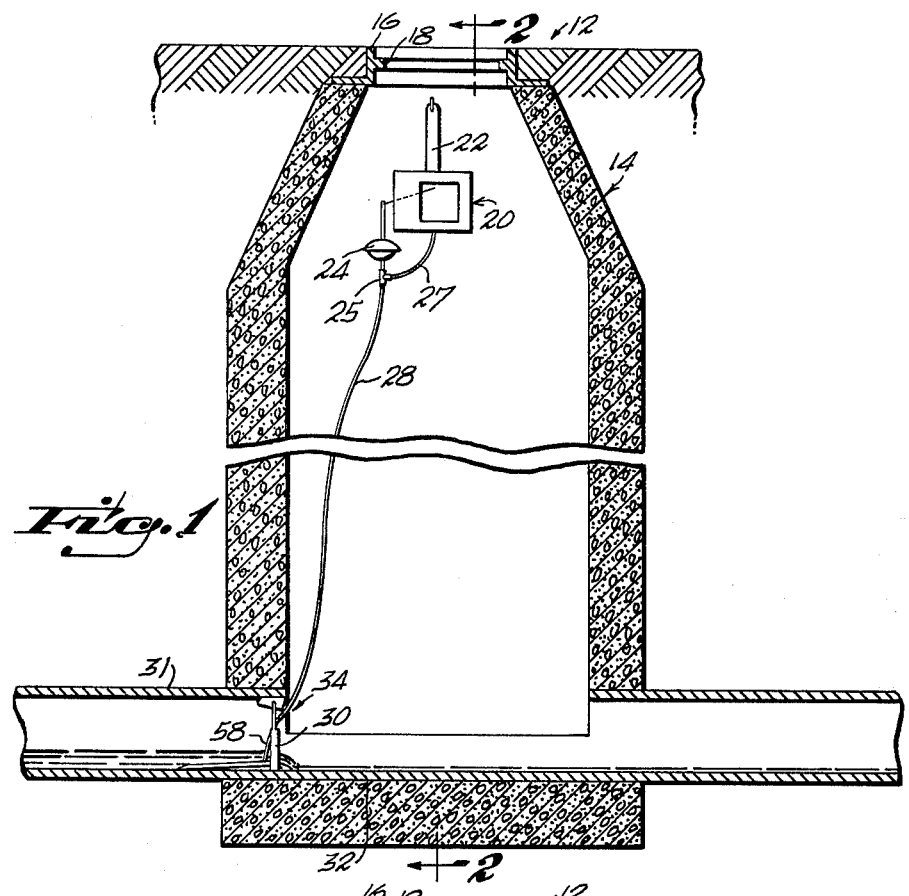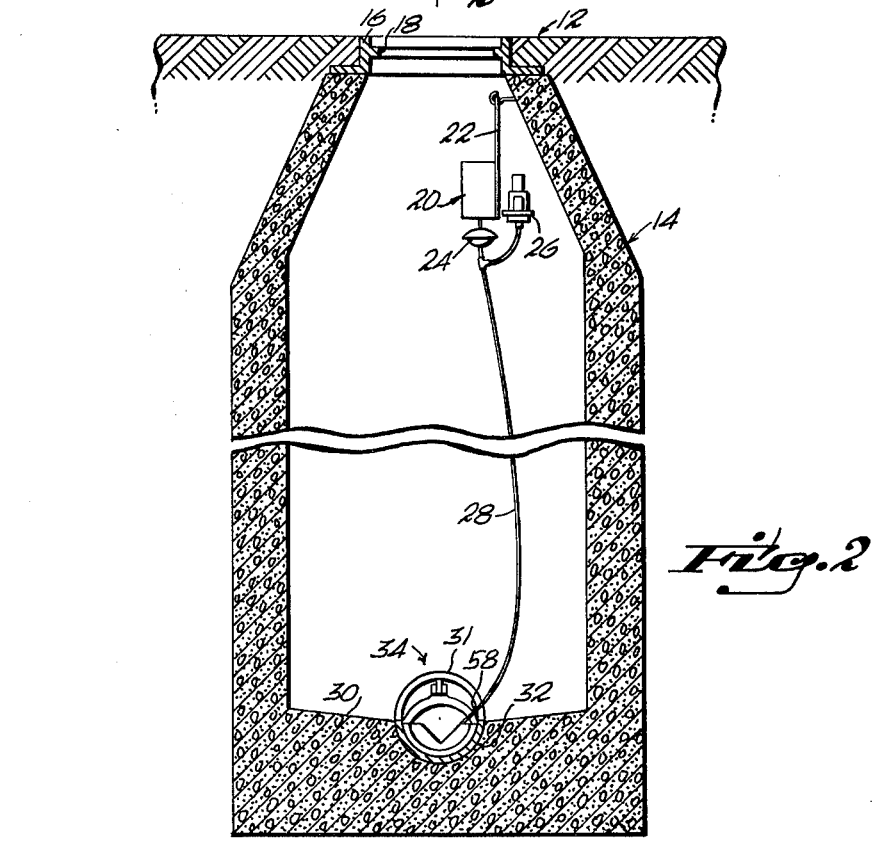

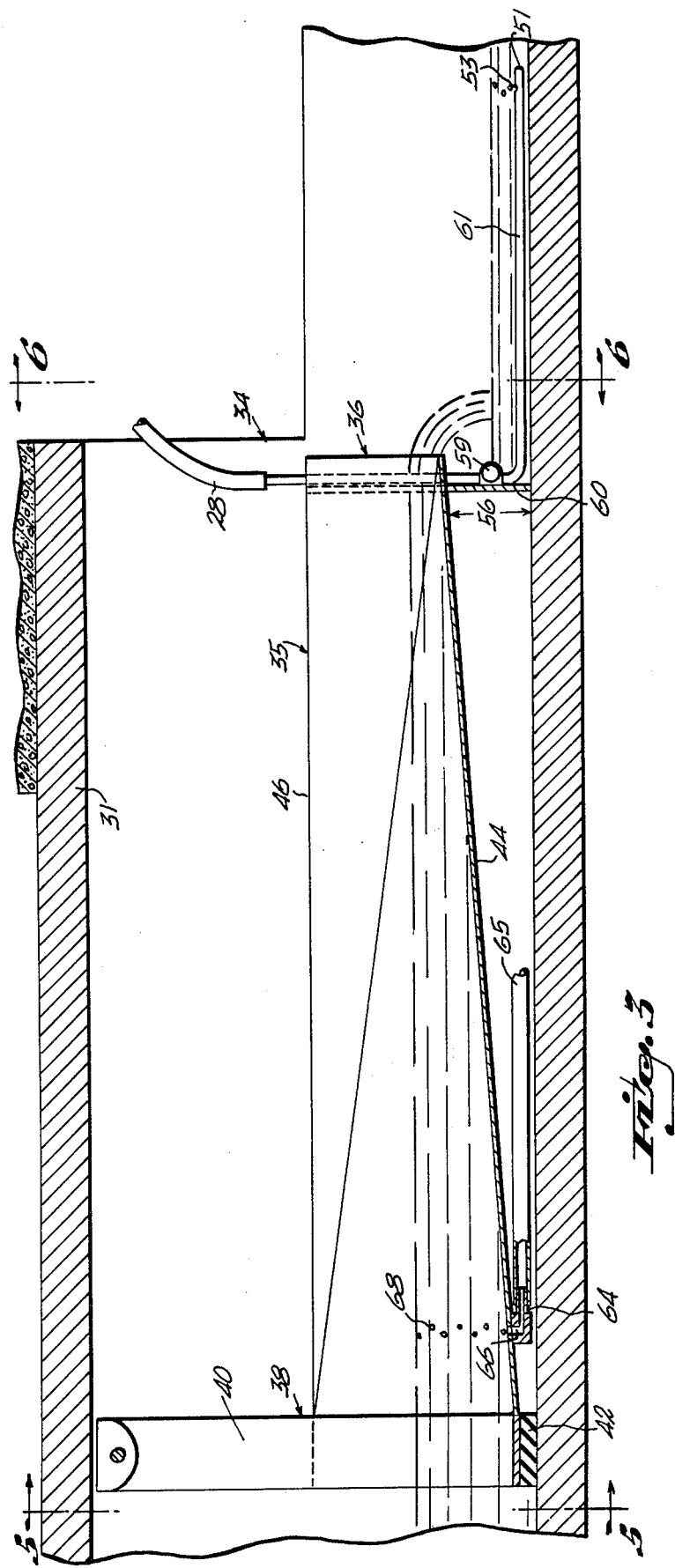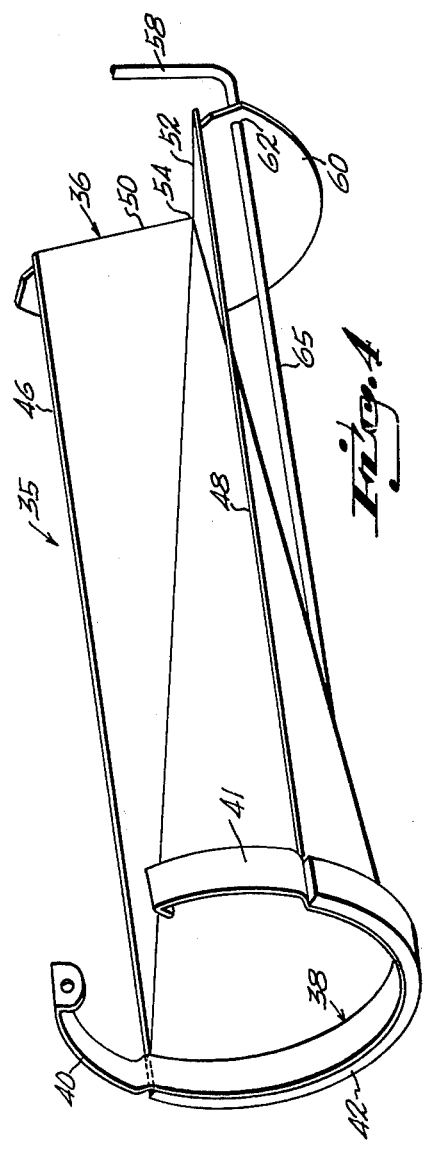

ANTI-CLOGGING FLUME AND STRUCTURE FOR METERING FLUID FLOW

BACKGROUND OF THE INVENTION

It is often necessary to measure the volume or time rate of flow of liquid flowing through a conduit, such as a sewer pipe, in order to determine the peak load carried by it or the condition of the pipe and whether there is leakage or infiltration due to ground water or storm run-off, as well as the degree of any such problem. For example, if the flow past one manhole location along a pipe is at a certain volume and, at an adjacent manhole location, the flow is quite different, the location of a failure in a burried pipe may be generally localized.

This invention is of an anti-clogging flume for use with a a metering device for determining the flow along a conduit path at a given location. It includes an improved flume which is structured to resist clogging caused by articles, such as sticks or paper, carried by the flow through the pipe, and a measuring apparatus for measuring the flow over a given time period, all is is explained more fully hereinafter.

OBJECTS OF THE INVENTION

It is a general object of this invention to provide a clogging resistant structure of a metering flume.

It is another object of this invention to provide an anti-clogging flume for use with a recording apparatus for measuring the depth of flow as a result of which the rate of flow may be determined.

It is an object of this invention to provide a relatively portable anti-clogging device for use in determining the rate of flow through a pipe, such as a sewer pipe, which is simple in construction, easy to install, and well adapted for the purposes which are set forth more fully hereinafter.

In accordance with these and other objects which will become apparent hereinafter, the instant invention will now be described with reference to the accompanying drawings, in which:

DESCRIPTION OF THE DRAWINGS

FIG. 1 is a general view of a sewer well and generally showing the environment of the use of the invention described more fully hereinafter;

FIG. 2 is a view similar to FIG. 1 comprising a right side view;

FIG. 3 is a view in cross section illustrating an installation of a preferred embodiment of the instant invention;

FIG. 4 is a perspective view of a metering flume constructed in accordance with this invention;

DESCRIPTION OF THE PREFERRED EMBODIMENT

Figure 5:
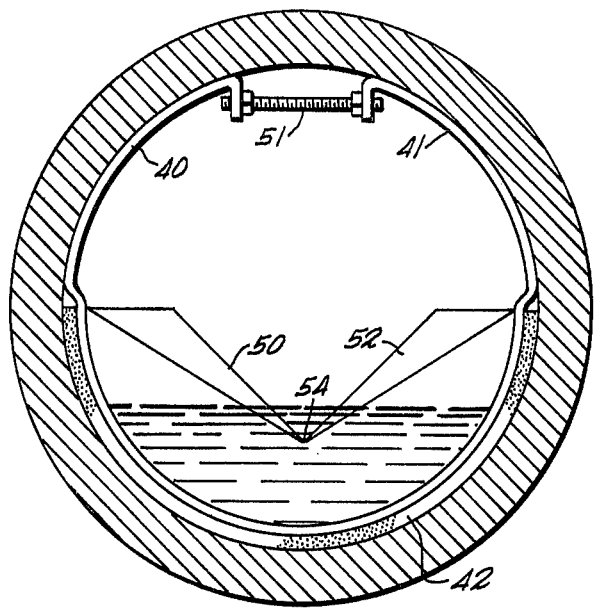
FIG. 5 is a view of the inlet end of the flume as seen in FIGS. 3 and 4.

Referring to the drawings wherein like reference characters designate like or corresponding parts throughout the several views, and referring particularly to FIG. 1, the numeral 12 designates a surface level, such as a roadway, beneath which a sewer well or manhole 14 is provided with access being through a hole covered by a manhole cover 16 with spanning ribs 18. Typically a cradle or trough 32 is provided in the well bottom 30 for the sewerage flow through the lower zone of the well; it communicates with the inlet pipe 31 at the mouth 34.

In the upper region of the well, suitably suspended, as from the manhole cover on a hanger means 22, a recorder 20 is preferably provided. It may be of the type available as an off-the-shelf item, such as that to which reference is made in U.S. Pat. No. 3,965,740, column 3, line 12. The recorder is interconnected by a hose 27 to a pump 24 which supplies pressurized fluid through the T joint 25 to it as well as to the line 28 which leads to the lower zone of the well for a purpose to be explained more fully hereinafter. The pump is suitably supported, as seen in FIG. 2, on a plate 26 which may be fixed to the recorder 20, hanger 22, or be independently suspended adjacent the recorder.

Referring now to FIGS. 3, 4, 5 and 6, there is shown a metering flume 35 which is adapted to be inserted through the mouth 34 and into the inlet pipe 31, as is shown in detail in FIG. 3.

Figure 6:
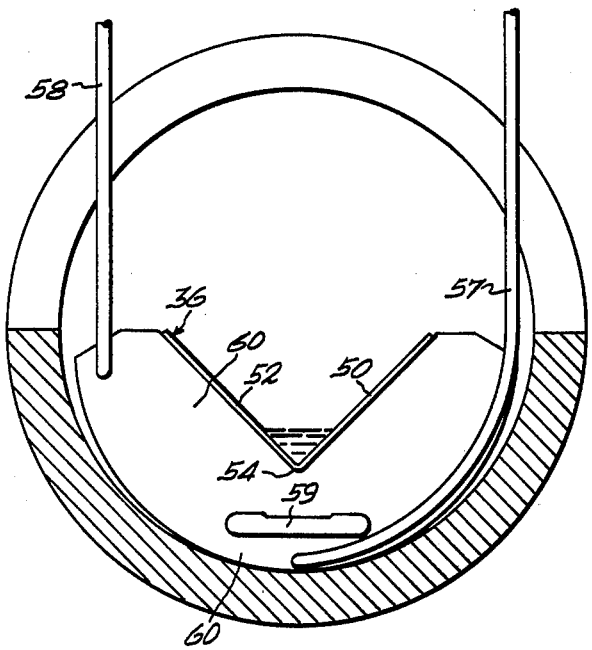
FIG. 6 is a view of the outlet end of the flume as seen generally in FIGS. 3 and 4.

The flume 35, see FIG. 4, is composed of a first, larger, generally cylindrical or circular end 38 and, spaced therefrom, a weir end 36. The lower zone of the larger end 38 is provided with an exteriorly carried and generally semi-circular seal 42 which has a surface conforming or mating with the inside surface of the inlet pipe. The end 38 has flexible band arms 40 and 41 which extend upwardly in converging relation to ends which receive a threaded length, see FIG. 5, to be expanded into abutting relation with the walls of the inlet pipe. The flume has a floor which slopes upwardly converging with the side walls 46 and 48 to the weir end so as to define a smoothly converging flow path from the inlet or larger end to the elevated weir end 36. In the preferred embodiment illustrated, the weir end, as best seen in FIG. 6, comprises a generally V-shaped opening between downwardly converging edges 50 and 52 meeting at a constricted passageway 54. The weir end 36 is provided with a foot 60 of predetermined height 56, see FIG. 3, above the lowermost surface of the seal 42.

It is thus seen that the metering flume seen in FIG. 4 is of a non-clogging structure. This structure is to be contrasted with an upstanding V-shaped plate at the weir end on a horizontal floor. This invention provides a smoothly and uniformly tapering flume length which will not readily become clogged and jammed by the first piece of debris, stick or paper or the like, flowing through the pipe. The presently disclosed structure might result in a temporary clogging at the weir end; however, this would be accompanied by a corresponding build-up of water level behind the temporarily clogged end which, when the head was sufficient, would force it through the weir end unclogging it again.

With continued reference to the flume, and particularly to FIG. 3, it is seen that an opening 66 is provided in the floor 44 adjacent the larger end 38 on the longitudinal centerline of the flume. The hole is provided with a fitting 64 to connect to a supply pipe 65 which is supported, as seen in FIG. 4 by the foot 60 at a hole 62. This pipe includes an upturned portion 58 to connect to the supply pipe 28 in FIG. 1. Thus, pressurized gas, such as air, passing along supply pipe 28 will bubble through the hole 66, as shown by the numeral 68 overcoming the resistance caused by the head, which is proportional to the height of the water at that point. Thus, the pressure required to release the gas is proportional to the depth of the water which is monitored by the recording device.

As seen in FIG. 6, a second hose or supply pipe 57 may be provided to supply fluid under pressure through the pipe 61, see to the right of FIG. 3, which pipe extends oppositely from that designated by the numeral 65 to an opening 53 at the terminal end 51 through which bubbles will be released.

Figure 7:
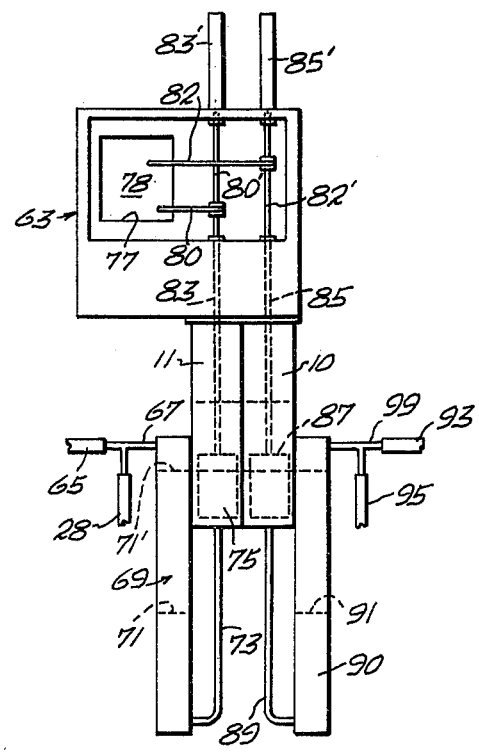
FIG. 7 is an improved recording device for use with the flume as is described more fully hereinafter.

Referring now to FIG. 7, a device 63, now to be described, may be substituted for the off-the-shelf recorder 20 of FIG. 1. The recorder 63 includes a housing and means to drive a paper band 78 arranged so as to move past and be visible within the window 77 of the housing. Suitable band drive means are well known in the art and hence not described in detail, it being sufficient to point out that a suitable battery energy source is provided in driving relation to the band drive. The paper band is exposed to two tracking pens. Alternatively, the paper may be of the commercially available type adapted to be marked in response to pressure applied by a point. In any event, the point in contact with the band is carried on an arm such as 80 and 82 affixed to vertically movable legs 80' and 82' constrained by guide means 83 and 83' and 85 and 85' to vertical movement only. The pins 80, 82 on the arm are thus responsive to liquid flow level by means of their connection to rods 83 and 85 respectively. Each of the rods is provided with a float piston 75 and 87, which are captivated in separate float towers 11 and 10. The operation is as follows. Pressure from the pump 24 is supplied through the hose 65 to the Tee joint where it branches, with a component moving through the line 28 to be expelled in the form of bubbles at the hole 66 of the flume as described above. The amount of pressure required to release the bubbles through the depth of the water is proportional to the water level. An equal component of pressure is conducted through the Tee branch 67 into the tower 69 to bear against the surface of liquid 71 moving it from the normal level 71' to force liquid through the tube 73 into the tower 11 raising the float 75 and, by so doing, the arm 80 with the tracking point. Similarly, pressure supplied through the Tee branch 99 to the pipe 95, which is connected to the pipe 57, will cause bubbles from the terminal end hole 53 of the pipe 61, shown in FIG. 3. A component of pressure exerted upon the water level 91 in the tower 90 is transmitted through tube 89 to lift the float 87 and with it the rod 85 and the point 82. It is thus seen that through this arrangement, the water level of the pond behind the outlet end of the flume is adapted to be measured as is the level of the flow from the spillway.

Referring now to the flume, the seal means described above is adjustable to conform to the configuration of the pipe 31. The seal means may be of any suitable type, such as that shown, or be of a bladder type such as that shown in U.S. Pat. No. 4,095,466. With further reference to the flume, the height of the lowest part of the spillway of the flume at the outlet end is elevated with respect to the floor level at the inlet end preferably being about one-fifth of the diameter of the pipe. Also, as is shown in the drawings, a leveling device 59 may be provided for a guide in adjusting the position of the flume when inserted as shown in the drawings.

It will be appreciated to those skilled in this art that the amount of liquid flowing over the weir end is a stream moving from one pond to another; but, notwithstanding, the relative level of the downstream pond must be such that there is a significant fall of the liquid over the weir in order to get a reasonably accurate measurement; and that the hole 66 should be substantially upstream in the upstream pond, preferably at a distance greater than three times the depth of the liquid flowing over the weir. The downstream hole 53, or depth sensing means for the downstream pond depth and the resulting reading are therefore a monitoring means of the continuing operation of the device while installed to determine that it is operating within a satisfactory range of precision. When the downstream pond depth increases, it will cause an indication that the flow over the weir is being recorded inaccurately and that there may be no actual flow over the weir as would be indicated by the upstream pressure required to release the bubbles from the hole 66. Under these circumstances there may be an obstruction downstream, or a pump failing to operate. In any event, the readings for the time interval involved are not correct and are disregarded.

It is thus seen that the flume is composed of a flow guide comprising a floor and side walls extending between a cylindrical or circular inlet end and a V-shaped outlet end and wherein the flow guide walls and floor converge smoothly and upwardly from the inlet end to the outlet end at which the V-shaped weir spillway is located. There is also provided, adjacent the inlet end, the means to constrain substantially all of the flow through the pipe to flow along the flow guide, it being noted that the outlet end of the flume is supported so that the spillway is elevated. Also, the flume has a hole in the floor adjacent the inlet end at substantially the lowermost portion of the floor which is provided with the nipple connection seen in FIG. 6, that is a fitting, which is fit to the exterior surface of the flume about the hole and connects to the conduit which is in fluid communication with the hole and which is utilized to bubble pressurized gas from a remote source through the flow over the flume for use with a recording device, the pressure required to bubble the gas through the liquid being a measure of the height of liquid flowing over the flume at the inlet end.

What is claimed is:

1. A flume for use in measuring flow through a pipe, said flume being adapted for installation in the pipe, said flume comprising; a length having an inlet and an outlet end and an interior surface and an exterior surface, said inlet end being generally circular, said outlet end having a V-shaped cross section, said length having a floor and side walls extending between the ends and defining a flow guide, said flow guide walls and floor converging smoothly upwardly from said inlet end to said outlet end, said walls and floor at said outlet defining a V-shaped weir spillway, means on the flume adjacent the inlet end to constrain substantially all the flow through the pipe to flow along the flow guide, means to support the outlet end of the flume, said flume having a hole in the floor portion adjacent the inlet end at substantially the lowest portion of the floor, a conduit for fluid communication with a remote source of pressurized gas, connector means to connect the conduit in fluid communication with the hole to bubble gas from the source through a liquid flowing over the flow above the hole, said conduit and said means to connect being supported by said flume exteriorly of said flow guide, and said means to connect comprising a fitting fixed to the exterior surface about the hole.

2. The device as set forth in claim 1 wherein said means to constrain the flow comprise seal means exteriorly carried on the flume at said inlet end.

3. The device as set forth in claim 1 wherein said means to constrain the flow comprise expandable arms and means to hold the arms in an expanded position.

4. The device as set forth in claim 1 wherein conduit means are provided on the outlet end of the weir and extend longitudinally away from said flume to a terminal end, and a hole is provided in said conduit means adjacent said terminal end.

5. The device as set forth in claim 1 including recording means to record the flow over the flow guide.

6. The device as set forth in claim 5 wherein said recording means are pressure operated.

7. The device as set forth in claim 5 wherein said recording means includes an upstream and a downstream sensing means.

* * * * *